WILLIAM S. WEIR Jr's.
Improved Cultivator
No. 4,610. Reissued Oct. 24, 1871.
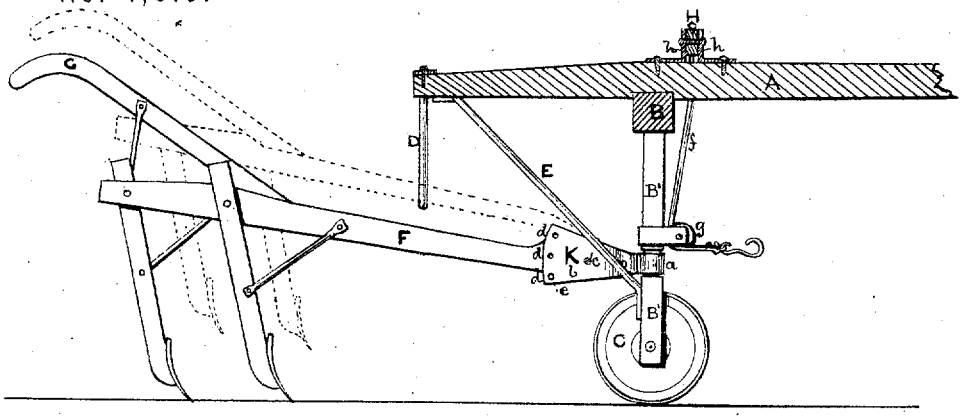
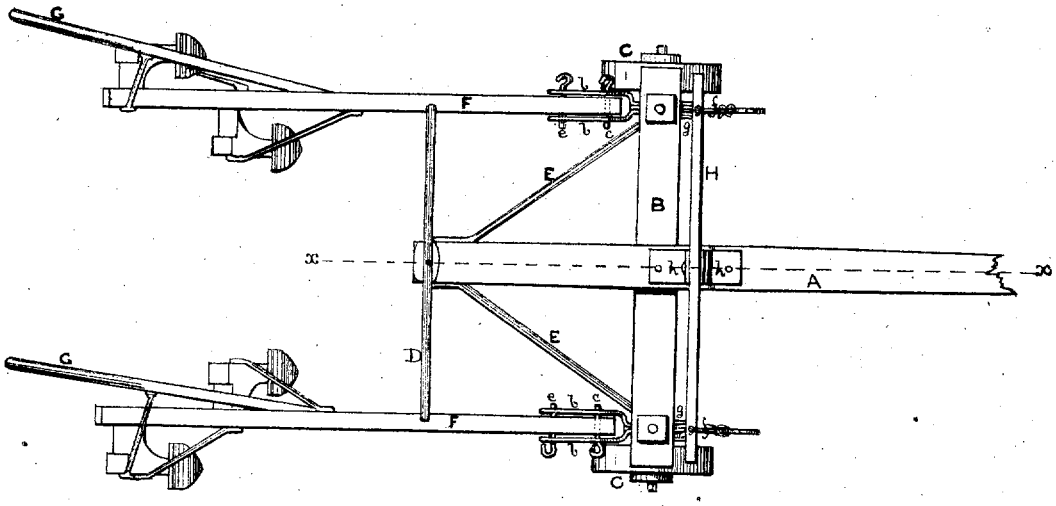
Witnesses:-
P. Hannay
Thos. W. Criddle
William S. Weir Jr.
(by) W. B. Richards & A. McCallum
Attys.
AM. PHOTO-LITHOGRAPHIC CO. N.Y. (OSBORNES PROCESS.)

UNITED STATES PATENT OFFICE.

WILLIAM S. WEIR, JR., OF MONMOUTH, ILLINOIS.

IMPROVEMENT IN CULTIVATORS.

Specification forming part of Letters Patent No. 37,251, dated December 23, 1862; reissue No. 4,610, dated October 24, 1871.

*To all whom it may concern:*

Be it known that I, WILLIAM S. WEIR, Jr., of Monmouth, in the county of Warren and State of Illinois, have invented certain Improvements in Cultivators, of which the following is a specification:

My invention relates to that class of truck or wheeled cultivators in which the operator walks and guides the plows, and in which the plows are arranged in two gangs so as to cultivate both sides of a single row of plants at the same time. The invention consists in a new and useful method of hinging the forward ends of the plow-beams to the upright standards or vertical bends of the axle or truck-frame by means of peculiar joint-pieces, which permit of the plow-beams, with their gangs of plows, being independently and freely moved in a vertical or lateral direction, and which retain said plow-beams in an upright position, during operation of the plows, without other connection or support than said joint-pieces. It also consists in a new and useful method of suspending the plow-beams, with their gangs of plows, clear above the surface of the ground when the plows are not in use; and, further, it consists in a new and useful combination of devices for regulating the depth of penetration of the plows or cultivator-teeth.

In the accompanying drawing, Figure 1 is a plan view of the machine, and Fig. 2 a longitudinal section of Fig. 1 on line *x x*.

A represents the tongue or draft-pole. B is the axle or truck-frame; its central portion is elevated sufficiently high to pass over the row without injuring the plants. The sides are made vertical, as shown at B′, and the ends project outwardly to receive the wheels C C. The rear end of the tongue projects back in rear of the axle for the purpose of affording a convenient means of supporting the plow-beams clear of the ground, and for this purpose it is provided with a bar, D, the ends of which are bent downward and forward into hooks, on which the plow-beams can rest. Braces E E connect the rear end of the tongue with the vertical standards B′ of the axle. F F are the plow-beams, each provided with a handle, G, and a gang of plows or cultivator-teeth. They are independently connected to the vertical standards of the axle or truck-frame by means of joint-pieces K, which are composed of loops *a* loosely fitted around the standards B′, which for this purpose are made round at the point of connection, and two plates, *b b*, which are made, like a sector-shaped segment, wide in rear and narrow in front, where they are bent inwardly and secured to the loops *a*. The wide ends of plates *b* are pierced with a series of bolt-holes, *d*. Between each pair of these plates *b* is pivoted one of the plow-beams by a bolt, *c*, and by means of the bolt-holes *d* and bolts *e*, on which the plow-beams are made to rest, the depth of penetration of the plows may be regulated. H is an evener, pivoted to the tongue between lateral plates *h*, so that its vibrations shall be vertical. Ropes or chains *f f* are attached to its ends and pass downward and around pulleys or rolls *g g*, which are secured to the uprights B′, immediately above and in front of the plow-beams. The ropes or chains then pass forward, their ends being provided with hooks, to which the whiffletrees are attached.

In operating the machine the horses are driven between the rows and the draft-pole is kept directly over and in a line with the row. It will be observed that the pole and central portion of the axle or truck-frame being elevated so as to pass over the plants without injury these portions of the machine are necessarily above a practicable line of draft, and that without some counterpoise the weight of the tongue would bear unduly upon the necks of the horses. By bringing down the line of draft by means of the ropes or chains *f f*, and attaching the whiffletrees to their hooked ends, this difficulty is obviated; and by securing the other ends of the ropes *f* to the vertically-vibrating evener H, it is obvious that the line of draft will be steadily maintained, notwithstanding that one horse may pull harder or start ahead of the other; while the plow-beams being attached immediately in rear and in a line with the draft, it is also obvious that the full force and effect of the draft is applied directly to the plow-beams. The driver walks behind and guides the plow-beams, and, through the peculiar joint-piece K, he can raise the plows clear of obstructions, or lower them, or move them to the right or left to avoid plowing out irregular plants, or to make them conform to the sinuosities of the row, without deviating from the line of progression of the machine; and should the driver, for any purpose, require to remove his hands from the plow-handles he may do so without stopping the team, as the plates *b* of the joint-piece K will retain the plow-beams in an upright position and prevent them from falling to one side. When it is desired to alter the depth of penetration of the plow or cultivator-teeth it is accomplished by moving the pins or bolts *e* on which the plow-beams rest to the higher or lower holes *d* of plates *b*.

When the plows are not in operation the beams may be suspended on the hooks of the bar D, for convenience in transporting the machine from place to place.

What I claim as my invention is—

1. The combination, in a walking straddle-row cultivator, of the following instrumentalities, viz.: Two wheels, C C, tongue A, axle B, and two plow-beams, F F, independently hinged to the axle by means of joint-pieces K K so constructed as that the plow-beams, with their gangs of plows, may be moved independently and freely in a lateral or vertical direction, and be retained during the operation of the plows in an upright position, without the aid of other connection or support, substantially as and for the purpose set forth.

2. The combination, in a walking straddle-row cultivator, of the following instrumentalities, viz.: Two wheels, C C, tongue A, axle B, and two plow-beams, F F, hinged as aforesaid, with a bar, D, or equivalent device, projected in rear of the axle, by means of which the plow-beams, with their gangs of plows, can be suspended clear above the ground when not in use, substantially as set forth.

3. The joint-pieces K K, constructed as described, with perforated plates *b b* and bolts *c* and *e*, in combination with the plow-beams F and uprights B′ of the axle, for the purposes set forth.

WILLIAM S. WEIR, JR.

Witnesses:
D. P. PHELPS,
J. A. PATTERSON.

(43)